United States Patent [19]

Ersoy et al.

[11] 4,351,516

[45] Sep. 28, 1982

[54] SWING CLAMP

[75] Inventors: Metin Ersoy, Hilchenbach-Müsen; Albrecht Weber, Hilchenbach, both of Fed. Rep. of Germany

[73] Assignee: Maschinenfabrik Hilma GmbH, Hilchenbach, Fed. Rep. of Germany

[21] Appl. No.: 227,841

[22] Filed: Jan. 23, 1981

[30] Foreign Application Priority Data

Aug. 20, 1980 [DE] Fed. Rep. of Germany ....... 3031368

[51] Int. Cl.[3] .............................................. B23Q 3/08

[52] U.S. Cl. .......................................... 269/27; 92/33; 269/32; 269/93

[58] Field of Search ....................... 269/24, 27, 32, 91, 269/93; 92/33

[56] References Cited

U.S. PATENT DOCUMENTS

| | | | |
|---|---|---|---|
| 3,362,301 | 1/1968 | Kohlitz | 269/27 |
| 3,572,216 | 3/1971 | Seesody | 269/32 |
| 3,605,569 | 9/1971 | Seesody | 269/32 |
| 3,948,502 | 4/1976 | Waller et al. | 269/27 |
| 4,265,434 | 5/1981 | Hamilton et al. | 269/27 |

*Primary Examiner*—Robert C. Watson
*Attorney, Agent, or Firm*—Martin A. Farber

[57] ABSTRACT

A hydraulically actuatable swing clamp, having a piston arranged within a housing, the piston rod of which extends in sealed manner out of the housing and carries a clamping arm, and which, in addition to an axial clamping movement, carries out a turning movement corresponding to a guide device, the turning movement effecting a swinging of the clamping arm, the guide device comprising a control bolt extending into the piston and being arranged normally non-rotatably on the housing, and at least two pairs of control curves, formed in a guide surface between the control bolt and the piston, and a guide member arranged on the piston or control bolt extending into the control curve. The guide member comprises at least two diametrically opposite and axially staggered guiding members. Each of the pairs of control curves comprises parallel extending axial sections adapted for pure clamping movement of the clamping arm and a left curve section for left-swinging rotation of the clamping arm in cooperation with said guide member, and a right curve section for right-swinging rotation of the clamping arm in cooperation with the guide member, the curve sections adapted for the swinging and simultaneous lifting movement. The left curve section and the right curve section of each of the pairs intersect each other, are axially staggered corresponding to the guiding members, and of respective of the pairs are respectively opposite to each other.

9 Claims, 3 Drawing Figures

SWING CLAMP

The present invention relates to a hydraulically actuatable swing clamp, particularly for clamping workpieces on the table of a machine tool, having a piston arranged within a housing, the piston rod of which extends in sealed manner out of the housing and bears a clamping arm, and which, in addition to an axial clamping movement, carries out a turning movement corresponding to a guide device, which latter movement effects a swinging of the clamping arm, the guide device consisting of a control bolt which extends into the piston and is arranged in normally unturnable manner on the housing as well as of at least one control curve which is formed in the guide surface between the control bolt and the piston with a helical curve section for the swinging and simultaneous lifting movement and an axial section for the pure clamping movement of the clamping arm and into which a guide member arranged on the piston or control bolt extends.

Such hydraulically actuatable swing clamps, which can either be actuated hydraulically in both directions of operation (double-acting embodiment) or in the case of a single-acting embodiment are provided with a return spring, are known in various embodiments. They replace known parts such as toggle levers, clamping irons or clamping claws on jigs and machines since their hydraulically actuated clamping arm not only effects a reliable clamping movement but is swung automatically into or out of the clamping space by a swinging movement of 90° in a plane lying perpendicular to the direction of clamping, whereby for example the insertion and removal of a workpiece are considerably simplified. In order to prevent damage either to the workpiece or to the swing clamp in the event of an improper or improperly introduced workpiece, the bolt which controls the swinging and clamping movement of the clamping arm can be fastened to the housing of the swing clamp by means of an overload safety which, in the event of a blocked swinging process, releases the control bolt which is normally arranged in non-turnable manner on the housing, so that it can effect a turning movement with respect to the housing, which avoids destruction.

In a first embodiment of the swing clamp described above, a ball which serves as guide member and is turnably supported on the piston engages in a control curve which is developed as a groove on the cylindrical surface of the control bolt. In this embodiment of the guide device it is necessary to manufacture different parts for the right swinging and left swinging embodiments of the swing clamp and keep them in stock. Swing clamps having a clamping arm which swings in only one direction cannot be employed for a different type of use.

In order to avoid these disadvantages, swing clamps are known which are also provided with only a single guide member arranged as a ball in the piston but have two control curves for the control bolt, the helically curved sections of which curves produce swinging movements of the clamping arm in opposite directions. Depending on the selection of the control curve into which the guide member engages there is thus obtained a left-swinging or right-swinging embodiment of the swing clamp. In order to avoid erroneous operation and disturbances in function, the control curves are so arranged on the control bolt that they do not intersect. Change of this known swing clamp from the left-swinging embodiment into the right-swinging embodiment requires practically complete disassembly of the swing clamp so that also in the case of this known convertible embodiment, in practice it is preferred to maintain a larger stock rather than to carry out the substantial amount of work necessary to convert the swing clamp in order to change the direction of swing.

Both of the known embodiments of swing clamps not only have the disadvantage that swing is possible only in one direction or being convertible into the other direction only with a large amount of assembly work, but also the disadvantage of a one-sided transverse load on the piston and control bolt due to the presence of only one guide member. This results in extensive wear of the moving parts and the danger of disturbances in operation.

The object of the present invention is to avoid the disadvantages of the known embodiments and to create a swing clamp of the above described type whose guide device, on the one hand, is not subjected to a one-sided loading while, on the other hand, it can be changed from a left-swinging to a right-swinging embodiment without any large amount of work so that universal use of the swing clamp is possible with only a reduced number maintained in stock.

The attainment of this object by the invention is characterized by at least two diametrically opposite axially staggered guide members (balls 18) and at least two pairs of control curves (19) having axial sections (**19*a*) extending parallel to each other, the curve sections (19*b*, 19*c*), of which curves, which are opposite each other in pairs, for left-swinging and right-swinging rotation respectively intersect each other and are axially staggered corresponding to the guide members (balls 18**).

By the guide members which are opposite each other and control curves which are accordingly opposite each other, the transverse loads within the guide device of the swing clamp counteract each other so that operation is improved and wear is reduced. By the axial stagger both of the two guide members and of the two control curves used in each case there is obtained an unambiguous guidance of the piston on the control bolt even if one guide member is in the crossing region of two curve sections since the other guide member maintains the positive guidance for the short distance of the crossing region. In this way it is possible, despite the arrangement of guide members and control curves in pairs opposite each other to develop the guide device in such a manner that a left-swinging or a right-swinging embodiment of the swing clamp can be created as desired.

In order that the clamping arm effect the intended swinging movement with minimum tolerance, the curve sections (**19*b*, 19*c*) of the control curves (19*d*) are extended at the end facing away from the axial section (19*a*) by in each case an additional piece (19*d***). The clamp arm thus, after the swinging motion also carries out a short axial movement which provides assurance that the specified swinging motion is maintained in accurately reproducible manner and is not dependent on the accidental end position in the curve section.

In order to be able to effect a particularly simple conversion between the left-swinging and the right-swinging embodiments of the swing clamp, the additional pieces (**19*d*) of the control curves (19*b*, 19*c*) which correspond to a guide member (for instance ball 18**) for the left-swinging and right-swinging rotation respectively are, in a further development of the invention, connected together by a transverse section (19*e*). This development in accordance with the invention makes possible a change in the direction of swing of the clamping arm without having to disassemble the swing clamp. It is merely necessary to loosen the housing lid which limits the return stroke movement of the piston in the manner of a stop to such an extent—for instance by screwing upward—that the guide members can enter into the additional section which constitutes a lengthening of the curve sections towards the top and from there into the transverse sections of the control curves. By a rotation of the piston by about 90°, the guide members then come into the additional section of the corresponding control curve which results in the opposite swinging movement of the clamping arm. After the tightening of the housing lid, the swing clamp then, upon its next actuation, carries out a swinging motion in the opposite direction. Since the transverse sections only connect control curves which belong to one guide member and, like the guide members are arranged axially staggered, the guide members can never enter into incorrect control curves so that defective conversion can be excluded with the embodiment in accordance with the invention.

In accordance with another feature of the invention, the axial sections (19*a*) of the control curves (19) can be limited corresponding to the maximum stroke of the piston (2) and be formed as a stop for the guide member (for instance, ball 18). In this way, easy assembly and disassembly of the piston in the housing is assured, as well as proper operation.

If in accordance with the invention, at least two of the four additional sections (19*d*) of the control curves (19) are lengthened by run-out sections (19*f*) which are open at the end, the assembling of the swing clamp is considerably simplified, since after the mounting of the control bolt the piston can be inserted in simple fashion from above into the housing, in which connection the guide members can be positively introduced into the control curves via the run-out sections which are open at the end.

A further development in accordance with the invention may also reside in the fact that the additional sections (19*d*) and run-out sections (19*f*) of the control curves (19) extend axially and are distributed uniformly in circumferential direction in the same way as the axial sections (19*a*). In this way the tolerances of the angle of swing are reduced to a minimum, which is particularly important for the upper position of the clamping arm, i.e. the unclamped position.

The control curves can be arranged either in the cylindrical surface of the control bolt or in the boresurface of the piston, the guide member being then arranged on the piston or on the control bolt respectively. An embodiment which is particularly simple to manufacture is obtained if the control curves (19) are developed in known manner as grooves in the control bolt (13) and the guide members are developed as balls (18) which are turnably supported in a cage ring (2*d*) in the piston (2).

One embodiment of the swing clamp of the invention is shown in the drawing, in which.

Figure 1:
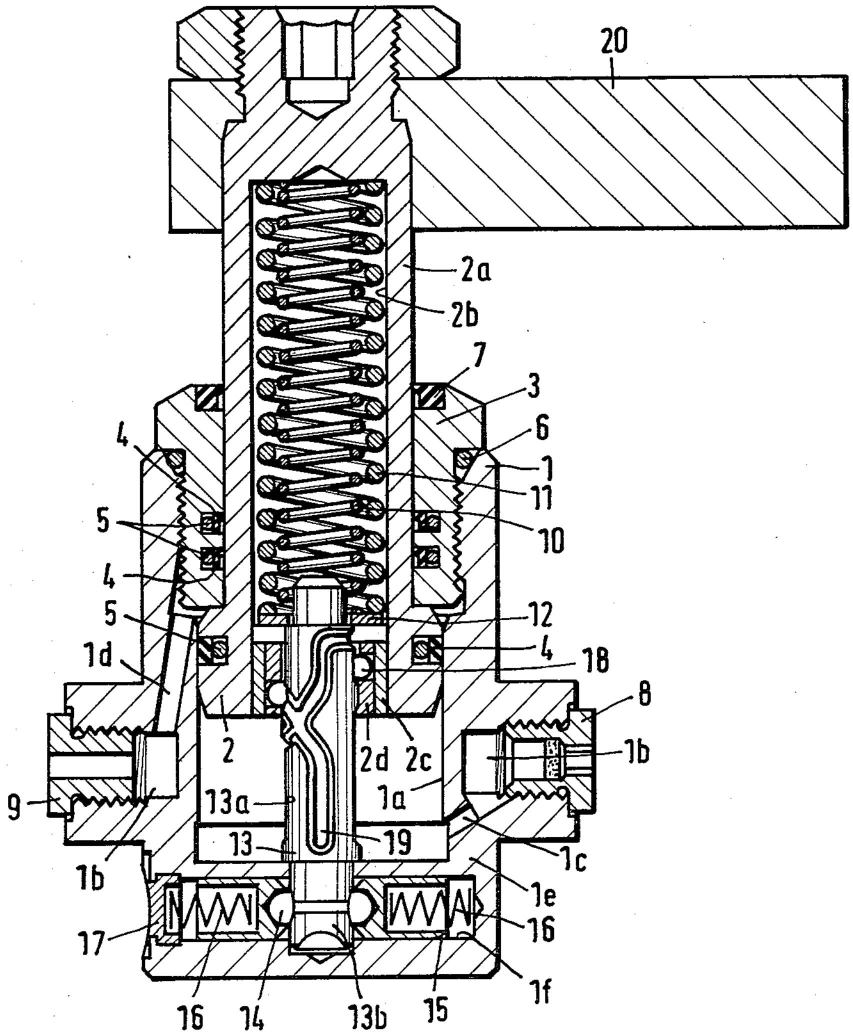
FIG. 1 is a longitudinal section through a swing clamp.

The swing clamp which is shown in the form of a double-acting embodiment in FIG. 1 has a housing 1 which is provided with a cylindrical bore 1*a* for a piston 2 whose piston rod 2*a* extends out of the housing 1 and guided in sealed fashion in a housing lid 3 which is screwed into the upper end of the housing 1. Both the piston 2 and the housing lid 3 are provided, for sealing purposes, with sealing rings 4 the sealing action of which is assisted by O-rings 5 placed thereunder. An O-ring 6 is also provided for sealing between the housing lid 3 and the housing 1. Finally, the housing lid 3 bears a scraper ring 7 which cooperates with the piston rod 2*a*.

Within the housing 1 there are formed two pressure-fluid connections 1*b* one of which, 1*b*, provided with a vent screw 8, is connected via a channel 1*c* with the bottom of the cylindrical bore 1*a* so that pressure fluid fed through this pressure-fluid connection 1*b* comes onto the bottom of the piston 2. The other pressure fluid connection 1*d* which is provided with a connection screw 9 is connected via a channel 1*d* with the upper part of the housing 1 so that pressure fluid can be guided onto the rod-side surface of the piston 2 through the channel 1*d* in order to effect the clamping motion. The return motion by means of pressure fluid fed through the channel 1*c* remains however unutilized in the embodiment shown. Instead of this, the return of the piston 2 into its initial position is effected by two return springs 10 and 11 which are developed as helical springs and are arranged in a central bore 2*b* in the piston 2 and the piston rod 2*a*. The vent screw 8 which closes the right-hand pressure-fluid connection 1*b* is provided with a filter so that the air can escape on the piston side without dirt or coolant being drawn in.

Both return springs 10 and 11 have their upper end resting in the bottom of the central bore 2*b* against the piston rod 2*a*. The lower end of the return springs 10 and 11 lies against a spring plate 12 which is arranged on a control bolt 13. This control bolt 13 which extends into the central bore 2*b* of the piston 2 has a cylindrical outer surface 13*a* and, at its lower end, a cylindrical holding pin 13*b* by which it is inserted into the bottom 1*e* of the housing 1. In the normal case, the control bolt 13 is held fast against rotation in the bottom 1*e* of the housing 1 by two locking elements 14 which engage into a detent depression 13*c* (see FIG. 2) in the holding pin 13*b* of the control bolt 13. The locking elements 14 are pressed via pressure pieces 15 by locking springs 16 against the control bolt 13, these pressure pieces, together with the locking elements 14 and the locking springs 16, being arranged in a transverse bore 1*f* in the bottom 1*e* of the housing 1. For greater ease in showing, this transverse bore 1*f* has been shown turned 90° in position in FIG. 1. It is closed by a plug 17 which is caulked in pressure-tight manner against the emergence of pressure liquid after the mounting of the parts 13 to 16. The application force of the locking springs 16 is so designed that in the normal case the control bolt 13 is held fast against rotation in the housing 1 but that turning of the control bolt 13 with respect to the housing 1 can take place when the forces exerted in circumferential direction on the control bolt 13 reach a value which could damage the control bolt or the parts cooperating with it.

In the central bore 2*b*, within the region of the piston 2, a holding ring 2*c* as well as a cage ring 2*d* are fastened in a manner fixed against turning. Within the cage ring 2*d* there are rotatably supported two balls 18 which lie opposite each other on a common diameter and are staggered axially with respect to each other. Each of these balls 18 engages into a separate control curve 19, said control curves being developed in the manner indicated below in the cylindrical surface 13*a* of the control bolt 13. The control curves 19 and the balls 18, which are to be considered as guide members, thus form with the control bolt 13 a guide arrangement for the piston 2 which, over a part of the stroke of the piston 2, results in a turning movement of the latter. This controlled turning movement of the piston 2 is utilized to swing a clamping arm 20 which is fastened to the end of the piston rod 2*a*, said arm serving, for instance, to clamp work pieces on the table of a machine tool.

Figure 2:
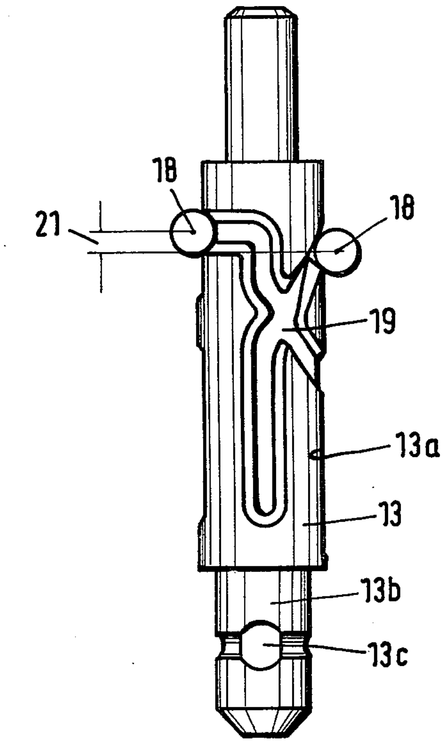
FIG. 2 is a side view of the control bolt used in the swing clamp of FIG. 1, shown on a larger scale.
Figure 3:
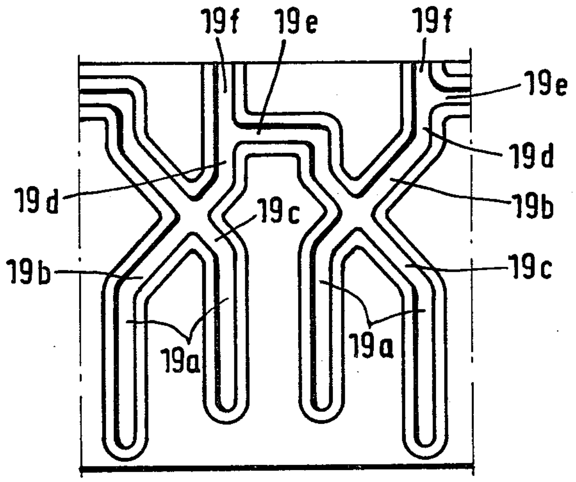
FIG. 3 is a developed view of the cylindrical surface of the control bolt of FIG. 2.

In the enlarged showing of FIGS. 2 and 3, the specific development of the control curves 19 is shown. In particular, the developed view of the cylindrical surface 13*a* of the control bolt 13 in FIG. 3 shows the position and course of the control curves 19.

As can be noted from FIG. 3, a total of four control curves 19 are developed in the cylindrical surface 13*a* of the control bolt, said curves having axial sections 19*a* which extend parallel to each other at their lower end and are distributed symmetrically over the circumference of the control bolt 13, these sections producing a pure clamping stroke of the piston 2 and thus of the clamping arm 20. Adjoining the upper end of these axial sections 19 there are helical curve sections 19*b* and 19*c* respectively which, in addition to a reciprocation of the piston 2 simultaneously provide a turning movement which, in the embodiment shown, takes place over a region of about 90° and causes a swinging of the clamping arm 20. While the helical curve sections 19*b* produce a swinging of the clamping arm 20 in clockwise direction at the start of the stroke, the helical curve sections 19*c* produce a swinging of the clamping arm 20 in the opposite direction, i.e. in counterclockwise direction, when looking at the clamping arm 20 from above.

Adjoining the upper end of the helical curve sections 19*b* and 19*c* which faces away from the axial section 19*a*, there are furthermore linearly and axially extending additional sections 19*d* of the control curve 19. These additional sections 19*d* serve for the precise determination of the position of the clamping arm 20 after its swinging motion since they define its end position and do not make it dependent on the accidental position of the balls 18 in the region of the curve sections 19*b* and 19*c*. The control curves 19 serving in each case for the positive guidance of a ball 18 are, as shown in FIG. 3, connected at the end of their additional sections 19*d* by a transverse section 19*e*. The balls 18 can enter these transverse sections 19*e* only when the housing lid is screwed slightly upwards from the end position shown in FIG. 1 out of the housing 1. In such case, the return springs 10 and 11 press the piston 2 upwards so that the balls 18 pass out of the helical curve sections 19*b* and 19*c* into the ends of the additional sections 19*d* and from there into the transverse sections 19*e*. When the housing lid 3 is loosened each ball can thus be transferred from the helical curve sections 19*b* into the helical curve section 19*c* so that after a loosening of the housing lid 3 a simple switching of the direction of swing of the clamping arm 20 is possible. At the same time, erroneous conversion work is made impossible since the transverse sections 19*e* connect only corresponding curve sections 19*b* and 19*c*.

From FIG. 2 it is clear that the transverse forces exerted by the balls 18 on the control belt 13 and on the piston 2 during the positive control of the piston 2 counteract each other since the balls 18 are diametrically opposite each other. The axial stagger 21 of the balls 18 which is shown in FIG. 2 has the result that despite the intersecting curve sections 19*b* and 19*c* a dependable positive guidance is at all times maintained since one ball 18 is always guided in the corresponding curve section 19*b* or 19*c* when the other ball 18 is in the crossing region of the two curve sections 19*b* and 19*c*. FIG. 3 shows clearly that the control curves 19 which correspond to the balls 18 are also displaced axially in accordance with the stagger 21, as can be noted not only from the ends of the axial sections 19*a* but also from the position of the transverse sections 19*e*. The crossing region is not so staggered.

In order to facilitate the assembly of the swing clamp described above and in particular to permit an insertion of the piston 2 provided with balls 18 into the housing 1 when the control bolt 13 has already been mounted, two of the additional sections 19*d* are lengthened in axial direction by run-out sections 19*f* which are open at the end. In this way it is possible to introduce the balls 18 from above into the control curves 19.

By omission of the stronger return spring 11 in the central bore 2*b* of the piston 2 and insertion of a connection screw 9 instead of the vent screw 8 in the pressure-fluid connection 1*b* shown to the right in FIG. 1, the swing clamp shown as example can be hydraulically actuated in both directions of movement of the piston 2. The return spring 10 which remains in the piston 2 in this case sees merely to the displacement of the piston 2 when the latter is to be converted from left-hand swing to right-hand swing without action of pressure fluid after the loosening of the housing cover 3.

While we have disclosed one embodiment of the invention it is to be understood that this embodiment is given by example only and not in a limiting sense.

We claim:

1. In a hydraulically actuatable swing clamp, particularly for clamping workpieces on a table of a machine tool, having a piston arranged within a housing, the piston rod of which extends in sealed manner out of the housing and carries a clamping arm, and which, in addition to an axial clamping movement, carries out a turning movement corresponding to a guide device, the turning movement effecting a swinging of the clamping arm, the guide device comprising a control bolt extending into the piston and being arranged normally non-rotatably on the housing, and at least one control curve, formed in a guide surface between the control bolt and the piston, having a helical curve section adapted for the swinging and simultaneous lifting movement and an axial section adapted for pure clamping movement of the clamping arm, and a guide member arranged on the piston or control bolt extending into the control curve, the improvement wherein said guide member comprises at least two diametrically opposite and axially staggered guiding members, said at least one control curve comprises at least two pairs of control curves, each of said pairs of control curves comprises:

parallel extending axial sections; and a left curve section constituting means for operatively effecting left-swinging rotation of the clamping arm in cooperation with said guide member, and a right curve section constituting means for operatively effecting right-swinging rotation of the clamping arm in cooperation with said guide member;

said left curve section and said right curve section of each of said pairs intersect each other and are axially staggered corresponding to said guiding members, said left curve sections and said right curve sections of respective of said pairs are respectively opposite to each other.

2. The swing clamp as set forth in claim 1, wherein said axial sections extend from one end of said curve sections, respectively, said control curves include additional sections extending and continuing from said curve sections at the other end of said curve sections remote from said axial sections.

3. The swing clamp as set forth in claim 2, wherein said additional sections are axially parallel to each other.

4. The swing clamp as set forth in claim 2 or 3, wherein said control curves include transverse sections connecting adjacent of said additional pieces of different of said pairs of said control curves.

5. The swing clamp as set forth in claim 1, wherein said axial sections are limited corresponding to a maximum stroke of the piston and are formed as abutment stops for the guiding members, respectively.

6. The swing clamp as set forth in claim 2 or 3, wherein at least two of said additional sections of the control curves extend into run-out sections respectively open at ends thereof.

7. The swing clamp as set forth in claim 6, wherein said additional sections and said run-out sections extend axially and are distributed uniformly in a circumferential direction, said axial sections are uniformly distributed in the circumferential direction.

8. The swing clamp as set forth in claim 7, wherein said control curves are grooves formed in the control bolt, and said guiding members are balls, a cage ring mounted in the piston, said balls are turnably mounted in said cage ring.

9. The swing clamp as set forth in claim 1, wherein said guiding members are balls.

* * * * *